Patented Sept. 15, 1936

2,054,301

UNITED STATES PATENT OFFICE 2,054,301

PRODUCTION OF PULVERULENT CELLULOSE

George A. Richter, Berlin, N. H., assignor to Brown Company, Berlin, N. H., a corporation of Maine No Drawing. Application April 17, 1935, Serial No. 16,814

11 Claims. (Cl. 92—1)

This invention relates to the production of pulverulent cellulose from suitable parent cellulosic materials. It deals more particularly with the production of cellulose powder from comparatively pure forms of cellulose, for instance, those forms that occur pure in nature or that are purified by chemical treatment. Such comparatively pure forms of cellulose include cotton or cotton linters, cotton rags, linen, sulphite pulp, kraft pulp, chemically preliberated cellulose or wood pulps in general, cellulose fibers or wood pulps of various kinds refined in alkaline liquors to high alpha cellulose content, say, about 93% to 98%, etc.

I have in previous patents described the production of pulverulent cellulose useful for various purposes, for instance, as an advantageous form of raw material for conversion into cellulose esters and other cellulose derivatives, as a filler or coating for paper or fabric products, and as a filler for molded plastics. I have found that a ball mill is capable of reducing dry cellulose fiber or pulp to the desired finely powdered condition but that the power requirements of such an instrumentality are high and its capacity low in terms of capital investment. Moreover, when the ball mill is constructed of iron or other metal, the pulverulent product is usually contaminated by metallic impurities abraded from the mill; and the use of a porcelain ball mill results in a pulverulent product of undesirably high ash content by reason of porcelain particles inevitably ground into the product from the mill.

The objective of the present invention is to make possible the mechanical reduction or subdivision of cellulose fiber or pulp in a wet way and the recovery of dry pulverulent cellulose of the desired fine particle size from the reduced wet mass with minimum power consumption and with the utilization of common or standard equipment.

In mechanically reducing cellulose pulp in the presence of water or other liquid vehicle, as by beater or jordan action, one does not arrive at a mass of uniformly reduced particle size. On the contrary, not only is the starting material made up of fibers of widely varying lengths, but the reduced mass is composed of fragments or particles of widely differing dimensions. Accordingly, in reducing a batch or mass of cellulose fiber as a whole to particular fineness or particle size, considerable energy is lost in working upon material that has already been reduced to the desired fineness. In other words, although a substantial fraction of the bath may in a relatively short period acquire the desired fine particle size, the reduction of the batch as a whole to such fine particle size may take very much longer, so that much energy may be needlessly expended in reworking a substantial part of the batch.

In accordance with the present invention, a batch or mass of cellulose fiber is mechanically reduced in the presence of a liquid vehicle, preferably water, to form particles of widely varying sizes, including a fraction of the desired fine particle size. The resulting suspension of cellulose is then screened to resolve it into a fine fraction which passes through the screen and a coarse fraction which is held back or retained by the screen. The coarse fraction may be returned for further reduction, whereas the fine fraction is dewatered to a substantially dry condition and its particles cleaved apart or separated by suitable mechanical treatment to form the desired pulverulent product. The screen employed for effecting a selective removal of the fine fraction from the remainder of the batch should be of appropriate fineness, say, a fineness of at least about 40 mesh, although screens of about 100 to 200 or even finer mesh may in some cases be preferred.

In some instances, the initial step of beating or similarly reducing the fiber in the presence of water may be progressively carried on to reduce progressively only a small part of the batch to fine particle size and such small part may be intermittently or progressively removed from the rest of the batch as it is being beaten. Thus, as a batch is being beaten and being circulated about the vat of an ordinary beater engine, it may be screened to permit an escape of only the small amount of fine cellulose particles developed after one or more passages under the beater roll. When a small amount of the batch, say, a small amount of a particle size finer than about 40 mesh, is removed intermittently or progressively from the batch as it is being beaten, the beater may be replenished with a corresponding amount of fresh pulp and water. In such case, the development of cellulose particles of the desired fine particle size is substantially continuous.

The method of the present invention may be carried out somewhat as follows. The cellulose pulp employed as raw material may be mixed with water to form a stock suspension of, say, about 2% to 3% consistency, as in the ordinary hollander or beater engine and beating of the stock may be carried on until a substantial fraction, say, one-quarter to one-third or more of the stock is capable of passing through a 40-mesh screen. If desired, however, beating may be continued until a substantial fraction of the stock can pass through a 100-mesh or even finer screen. The beaten stock may then be delivered as a stream to a screening system which permits the desired fines, that is, the cellulose fiber fragments or particles of the desired fine particle size, to pass therethrough. Thus, the screen may be of a mesh ranging from about 40 to 200. If desired, a succession of screens of progressively finer mesh may be employed to enable the recovery of fine fractions of different fine particle sizes, say, separate fractions of a fineness of 40, 100, and 200 mesh. In screening the reduced or beaten wet mass, provision may be made for diluting it with water to a much lower consistency than that at which beating was effected; and, in order to avoid clogging of the screen or the formation of a mat thereon, water sprays, brushes, or similar devices may be advantageously used to keep the screen openings from becoming so fouled as to cut down unduly the screen capacity. The fraction of the suspension that passes through the screen may be thickened, as by delivery to settling vats or a continuous settling system, and the thickened material recovered for further treatment.

The one or more fractions of fine cellulose thus recovered as a suspension or slurry in water may then be dewatered to substantial dryness. Thus, the suspension of fine particles may be delivered to a rotary or other suitable filter and the particles accumulated and recovered as a thick mass or cake. The thick mass may then be dried in any suitable manner and the dried mass put through a suitable mechanical disintegrator, such as one or more hammermills or similar impact mills, which function to cleave apart the fiber fragments or particles of which the dried mass is composed. The particles are more or less bonded together in the dried mass, the tenacity of such bonding depending in large measure upon the degree of hydration developed in the stock during the initial beating operation. However, a hammermill or similar impact mill readily does the work of cleaving apart the bonded fine fiber fragments or particles even though neither of these instrumentalities are able to reduce the original fiber to pulverulent form. It is well known, for instance, that a hammermill fluffs up a dry mass of pulp without, however, materially reducing or sub-dividing its fibers as does a ball mill.

The resulting pulverulent product delivered by the hammermill or similar impact mill may, if desired, be classified into fractions of different particle size in a suitable screening or air-separating system. As already indicated, the finished pulverulent product may have a particle size ranging from about 40 to 200 or even finer mesh.

The conditions under which the initial step of reducing the cellulose fiber in water is carried out are subject to considerable variation, but I shall indicate some of the conditions that may prevail. In order to facilitate the separation or cleaving apart of the cellulose particles in the dried fines fraction subsequently prepared, it is preferable to carry out the initial wet-reduction or beating of the cellulose fiber under conditions unfavorable to hydration or gelatinization of the stock. Thus, beating of the stock at such low consistencies as downwards of about 2% and at higher than normal temperatures, for instance, temperatures of about 30° to 80° C., tends to retard hydration. So, too, the use of refined wood pulps or other fibers having high alpha cellulose content, say, an alpha cellulose content upwards of about 93% or the use of a thoroughly mercerized cellulose pulp is accompanied under given beating conditions by distinctly less hydration than takes place in the case of such usual wood pulps as kraft or sulphite. By reason of their lower tendency to hydrate as well as their higher purity, I prefer to use such refined or mercerized pulps as raw material even though it is possible to apply the method of the present invention even to mechanical wood pulp or so-called groundwood. The character of the beating equipment also influences the properties of the beaten stock. Thus, I prefer for certain fluffy types of powder to use a beater or jordan equipped with sharp tackle since the sharper the knives, the less tendency is there for hydration of the stock. It is preferable that the beater roll knives and the bed plate of the beater be constructed of chrome steel or other suitable substantially non-corrosive metal so as to minimize contamination of the beaten stock by metallic impurities. However, it is possible to employ a stone-roll beater or beaters equipped with blunt tackle, in which case the stock tends to become hydrated especially if it is of a readily hydratable character. The character of the pulverulent product is a reflection of the particular fiber that has been employed as a raw material and/or the particular beating equipment that has been used. Thus, sharp tackle is conducive to a granular pulverulent product, blunt tackle, a fibrous product, and a stone-roll beater, a pulverulent product of high density. A starting or parent fiber that is easily hydrated also conduces to a pulverulent product of high density. In some instances, it may be desirable to use as the starting material a preliberated and, if desired, purified wood pulp or the like that has not undergone drying preparatory to being delivered to the beater engine, as such fiber is more easily hydrated than a predried fiber. However, a predried fiber, because of its lower tendency toward hydration, may be preferred when a fluffy cellulose powder is the objective. A pulverulent product of high density evidently gets its density as a result of hydration of its cellulose structure and the pronounced shrinkage that the hydrated particles undergo during drying. In this connection, it might be observed that when the aim is to produce a pulverulent product composed of particles of high density, it may be desirable to beat the parent stock at high consistency and/or at low temperature, since such latter conditions favor hydration and the subsequent shrinkage of the hydrated particles conduces to dense powder particles more suitable for some purposes than a fluffy powder.

During the wet-reducing or beating operation, chemicals of an alkaline or acid nature may be added to the stock. For instance, alkalies, acids, salts, or acid salts, may be valuable additions when pulverulent product is to undergo conversion into cellulose esters or derivatives. If desired, the fine fraction separated from the rest or coarse fraction of beaten stock may be put through one or more purifying treatments before it is dried. Thus, if impurities such as iron, copper, chromium, manganese and the like creep into the fine fraction during the beating operation, the separated fine fraction may be treated with suitable acid solutions capable of dissolving impurities and then be washed. For instance, iron impurities may be dissolved with such acids as a dilute sulphurous or oxalic acid solution. The separated fine fraction may, if desired, be refined to high alpha cellulose content, particularly in those instances when the starting pulp is associated with considerable non-alpha cellulose components, as is true in the case of such ordinary chemical wood pulps as kraft and sulphite. Thus, the separated fine fraction may be treated with a warm or hot dilute alkaline liquor to remove beta and gamma celluloses, oxycelluloses, resins, or other impurities therefrom; or it may be treated with a strong alkaline liquor at room or lower temperatures to extract such impurities and also considerable pentosans. The purified fraction may then be washed, dried, and subjected to the final mechanical disintegrating treatment designed to cleave apart the fine particles.

While the initial step of beating or reducing the fiber is preferably performed in water, since water is, of course, the least expensive and hence the most attractive liquid vehicle, nevertheless, it is possible in lieu of water to use alcohol, benzol, acetone and other liquid media. Such latter liquid media possess an important advantage over water in that they do not tend to induce hydration of the fiber, wherefore, the step of final disintegration of the dried or deliquefied fine fraction is facilitated.

I shall now describe in a general way another practice performed in accordance with the present invention. A batch of about 1000 pounds of refined wood pulp, for instance, pulp having an alpha cellulose content of about 93% to 95% may be put into a beater engine together with sufficient water to produce a stock of about 2% consistency at about 20° C. The beater engine is preferably one equipped with sharp chrome-steel tackle both as regards the beater roll and bed plate. The roll may be set in operation to cut the stock drastically and, as beating continues, the temperature of the stock progressively may rise to a temperature of about 35° C. in a five to six hour period. At the end of such time, it will be found that most of the stock is capable of passing through a 100-mesh screen. Indeed, delivery of the stock to a 100-mesh screen will result in the passage of about 80% of the stock through the screen. The fine fraction thus passed through the screen is preferably delivered to a settling system wherein settling may be allowed to take place until a slurry of about 10 to 12% cellulose consistency is had, whereupon the concentrated mass or slurry of fine cellulose particles may be delivered to a vacuum filter on which the particles may be recovered as a semisolid mass or cake. It is, of course, possible to use the ordinary plate filter or filter press for recovering the fine cellulose particles in cake form. Through such a filtering operation, a mass or cake of about 30% to 50% solids content can be recovered, the particular solids content depending upon the degree of hydration in the particles. The lower the hydration, the more dewatered is the mass removed from the rotary filter or filter press.

The thick layers or cakes removed from the rotary filter or filter press are preferably reduced to lumps of about the size of walnuts, as by passage through a rough or coarse disintegrator. These wet lumps may then be readily and continuously dried as by passage through a hot air dryer. If the particles constituting the dried lumps have been well hydrated, the lumps are apt to be hard and tough, whereas, on the other hand, lumps composed of particles which have not been materially hydrated can be broken up into fine particles by mere rubbing or tearing by hand. The dried lumps are passed through a hammermill serving to reduce them to much smaller entities, whereupon, the reduced material is passed through a second hammermill or similar impact disintegrator which liberates cellulose particles of a size approximating those present in the fine fraction of wet stock obtained from screening the beaten stock. In other words, impact action on the dried fine fraction results in the cleaving apart of the particles constituting such fraction and the production of a pulverulent cellulose product whose particle size approximates that of the fine wet fraction segregated from the coarse fraction of the whole beaten batch. The pulverulent product may, if desired, be separated into fractions of different particle sizes by sifting or screening operations, such small or adventitious percentage of oversized material as survives the final disintegrating operations either being re-beaten or returned to the final impact disintegrators. While it is preferable to subject the initially beaten stock to a screening operation to remove selectively therefrom a fraction of fine particle size and more particularly a fraction of a particle size finer than about 40 mesh, since such a practice makes for minimum power consumption, as hereinbefore described, nevertheless, it is possible to carry out the initial beating or wet-reducing operation under such conditions and for a sufficiently long period of time to reduce the batch of fiber substantially entirely to the desired state of fineness. In such latter case, screening of the beaten or reduced wet mass need not be effected; and such oversized particles as exist in the disintegrated dried product, which is produced by dehydrating the beaten mass as a whole and subjecting it to impact action, may be removed in a final step of dry-screening or sifting, as hereinbefore described.

I claim:—

1. A method of producing pulverulent cellulose which comprises mechanically reducing to fine particle size only a fraction of a cellulose fiber batch in the presence of water, selectively removing and recovering said fine fraction from the remainder of the batch, dewatering said fine fraction to a substantially dry condition to form a substantially dry mass or cake, and mechanically cleaving apart the particles of said dried mass or cake to form pulverulent cellulose.

2. A method of producing pulverulent cellulose which comprises beating a batch of cellulose pulp as an aqueous suspension to reduce only a fraction thereof to fine particle size, screening said batch to separate it into a fine particle size fraction and a coarse particle size fraction, dewatering said fine particle size fraction to a substantially dry condition to form a substantially dry mass or cake, and mechanically cleaving apart the particles of said dried mass or cake to form pulverulent cellulose.

3. A method of producing pulverulent cellulose which comprises beating a batch of cellulose pulp as an aqueous suspension to reduce only a substantial fraction thereof to a particle size finer than about 40 mesh, screening said batch to separate it into said fine particle size fraction and a coarser fraction, dewatering said fine particle size fraction to a substantially dry condition to form a substantially dry mass or cake, and mechanically cleaving apart the particles of said dried mass or cake to form pulverulent cellulose.

4. A method of producing pulverulent cellulose which comprises progressively beating a batch of cellulose pulp as an aqueous suspension to reduce progressively only a part thereof to fine particle size, selectively removing said fine particles from the batch as it is being beaten, dewatering said removed fine fraction to a substantially dry condition to form a substantially dry mass or cake, and mechanically cleaving apart the particles to said dried mass or cake to form pulverulent cellulose.

5. A method of producing pulverulent cellulose which comprises progressively beating a batch of cellulose pulp as an aqueous suspension to reduce progressively only a part thereof to a particle size finer than about 40 mesh, selectively removing said fine particles from the batch as it is being beaten and adding fresh pulp and water to the batch being beaten, dewatering said removed fine fraction to a substantially dry condition to form a substantially dry mass or cake, and mechanically cleaving apart the particles of said dried mass or cake to form pulverulent cellulose.

6. A method of producing pulverulent cellulose which comprises mechanically reducing a mass of cellulose fiber in the presence of water to form particles of widely varying sizes, including a fraction of a particle size finer than about 40 mesh, selectively removing only said fraction from the remainder of the mass, dewatering said fraction to a substantially dry condition to form a substantially dry mass or cake, and mechanically cleaving apart the particles of said dried mass or cake to form pulverulent cellulose.

7. A method of producing pulverulent cellulose which comprises mechanically reducing a mass of cellulose fiber in the presence of a liquid vehicle to form a suspension of particles of widely varying sizes, including a fraction of a particle size finer than about 40 mesh, screening said suspension to separate it into such fraction and a coarser fraction, deliquefying substantially completely the separated fine particle size fraction to form a substantially dry mass or cake, and mechanically cleaving apart the particles of said deliquefied mass or cake.

8. A method of producing pulverulent cellulose which comprises mechanically reducing a mass of cellulose fiber in the presence of water to form fine cellulose particles, dewatering such reduced material to a substantially dry condition to form a substantially dry mass or cake, and mechanically cleaving apart the particles of said dried mass or cake to liberate particles of a size approximating those present in the wet mass resulting from the initial reducing operation.

9. A method of producing pulverulent cellulose which comprises mechanically reducing a mass of cellulose fiber in the presence of water to form particles of widely variant sizes, including a fraction of a particle size finer than about 40 mesh, dewatering such reduced material to a substantially dry condition to form a substantially dry mass or cake, mechanically cleaving apart the particles of said dried mass or cake to liberate particles of a size finer than about 40 mesh, and removing from such fraction such material as has a particle size greater than about 40 mesh.

10. A method of producing pulverulent cellulose which comprises beating to fine particle size only a fraction of a cellulose fiber batch in the presence of water under conditions to hydrate the fiber and fiber particles, selectively removing and recovering said fine fraction from the remainder of the batch, dewatering said fine fraction to a substantially dry condition to form a substantially dry mass or cake, and mechanically cleaving apart the particles of said dried mass or cake to form pulverulent cellulose.

11. A method of producing pulverulent cellulose which comprises beating to fine particle size only a fraction of a hydratable cellulose fiber batch in the presence of water under conditions to hydrate the fiber and fiber particles, screening said batch to separate it into a fine particle size fraction and a coarse particle size fraction, dewatering said fine particle size fraction to a substantially dry condition to form a substantially dry mass or cake, and mechanically cleaving apart the particles of said dried mass or cake to form pulverulent cellulose.

GEORGE A. RICHTER.